(12) United States Patent
Kögel et al.

(10) Patent No.: US 6,349,045 B1
(45) Date of Patent: *Feb. 19, 2002

(54) SWITCHED-MODE POWER SUPPLY WITH SWITCHING-OFF FROM SECONDARY SIDE

(75) Inventors: Reinhard Kögel, Brigachtal; Achim Elgert, Dauchingen, both of (DE)

(73) Assignee: Deutsche Thomson-Brandt GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/602,981

(22) Filed: Jun. 23, 2000

(30) Foreign Application Priority Data

Jul. 16, 1999 (DE) .......................... 199 32 711

(51) Int. Cl.$^7$ .............................................. H02M 7/537
(52) U.S. Cl. .......................................... 363/20; 363/97
(58) Field of Search .............................. 363/20, 21, 97, 363/131

(56) References Cited

U.S. PATENT DOCUMENTS 4,648,016 A * 3/1987 Peruth et al. ................. 363/21
5,019,955 A * 5/1991 Hoeksma ..................... 363/21
5,515,256 A * 5/1996 Yokoyama ................... 363/18

FOREIGN PATENT DOCUMENTS

DE 3731645 3/1989
DE 19545659 6/1997
EP 0618665 10/1994

* cited by examiner

Primary Examiner—Adolf Deneke Berhane
(74) Attorney, Agent, or Firm—Joseph S. Tripoli; Joseph J. Laks; Joseph J. Kolodka

(57) ABSTRACT

The switched-mode power supply comprises a transformer, a switching transistor connected in series with a primary winding of the transformer, a primary-side control circuit and a secondary-side regulating stage. The regulating stage is coupled to a coupling element for transiting a regulating signal from the secondary side to the primary side. A first switch is situated between the control input of the switching transistor and a primary-side operating voltage, and a second switch is situated between the regulating stage and a secondary-side operating voltage, with the two operating voltages being able to be disconnected using a single control signal. In this case, the isolating element transmits both the regulating information for the primary-side control circuit and the turn-off signal for the first switch. If the second switch is turned off by the control signal, the regulating stage and the optocoupler become completely currentless and consume no further power. As a result of this, the optocoupler is off on the primary side, which means that the first switch is also turned off, so that both the switching transistor and the control circuit become currentless. In this situation, the switched-mode power supply is completely currentless except for the starting circuit, so that the power consumption is reduced down to below 0.2 W in the off-state.

18 Claims, 1 Drawing Sheet

SWITCHED-MODE POWER SUPPLY WITH SWITCHING-OFF FROM SECONDARY SIDE

BACKGROUND

The present invention relates to a switched-mode power supply having a transformer, a switching transistor connected in series with a primary winding of the transformer, a control circuit and a secondary-side regulating stage. Switched-mode power supplies of this type are used in appliances for consumer electronics, for example.

To be able to turn appliances having a switched-mode power supply on and off using a remote control, it is necessary to keep them in a constant standby mode in order to turn them on. However, this means that the switched-mode power supply is constantly consuming power. To keep the power consumption of the switched-mode power supply as low as possible in standby operation, switched-mode power supplies with a burst mode have been developed, for example, or a separate power supply unit is used just for standby operation. EP-A 0 803 966 discloses a power supply unit, for example, in which a relatively large switched-mode power supply is used just for normal operation and a smaller switched-mode power supply is used for standby operation. In this arrangement, the two switched-mode power supplies are coupled to one another such that the larger switched-mode power supply is regulated by means of the small switched-mode power supply during normal operation, and the small switched-mode power supply oscillates using a dedicated oscillator in standby operation.

BRIEF SUMMARY OF THE INVENTION

The invention is based on the object of specifying a switched-mode power supply of the type mentioned in the introduction which has a very low power consumption.

The switched-mode power supply of the invention has a transformer, a switching transistor connected in series with a primary winding of the transformer, a primary-side control circuit and a secondary-side regulating stage. In this arrangement, the control circuit is used to drive the switching transistor. The secondary-side regulating circuit is used to drive a coupling element, which is used to transmit a regulating signal from the secondary to the primary. A first switch is situated between the control input of the switching transistor and a primary-side operating voltage, and a second switch is situated between the regulating stage and a secondary-side operating voltage, with the two operating voltages being able to be disconnected by means of the two switches using a single control signal. In this case, the isolating element transmits both the regulating information for the primary-side control circuit and the turn-off signal for the first switch.

In this case, the control signal for turning off the two switches is applied to a control input of the second switch, and, when this switch is off, the secondary-side regulating stage is disconnected at the same time and the first switch is turned off via the coupling element. The coupling element is preferably an optocoupler driven on the secondary side by a transistor stage of the secondary-side regulating stage, at which both the switched-mode power supply's output voltage which is to be regulated and, via the second switch, the control signal information are present.

If the second switch is turned off by the control signal, the regulating stage and the optocoupler become completely currentless and consume no further power. As a result of this, the optocoupler is off on the primary side, which means that the first switch is also turned off, so that both the switching transistor and the control circuit become non-live. In this situation, the switched-mode power supply is completely currentless except for the starting circuit, so that the power consumption is below 0.2 W in this state.

BRIEF DESCRIPTION OF THE DRAWING

The invention is explained in more detail below with reference to a schematic circuit diagram, which shows a switched-mode power supply, according to the invention, having primary-side and secondary-side circuitry.

DESCRIPTION OF THE PREFERRED EMBODIMENT

Figure 1:
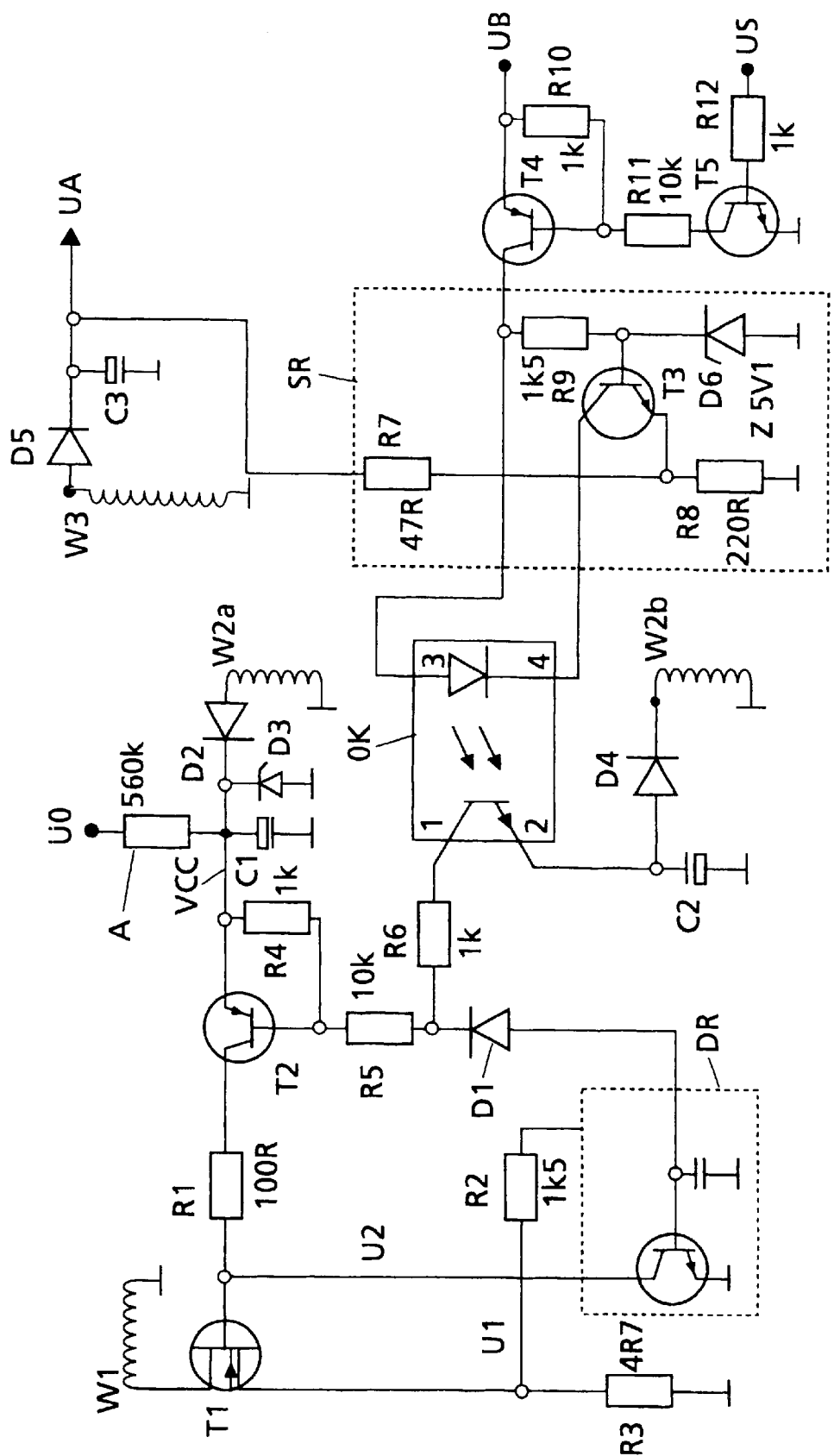

The FIGURE shows, on the primary side, a switching transistor T1 in series with a primary winding W1 of a transformer. For the purposes of simpler illustration, the transformer is not shown in the FIGURE; as is usual with appliances in entertainment electronics, it is designed with mains power isolation and, apart from the primary winding W1, contains one or more primary windings for operation of the switched-mode power supply, and, on the secondary, one or more windings for providing the required output voltages.

In this illustrative embodiment, the transistor T1 is a MOSFET controlled by a control circuit DR. The primary-side auxiliary winding W2a is used to provide an operating voltage VCC which is rectified via a diode D2 and is buffered by a capacitor C1. A starting circuit A, which establishes a connection to the power supply rectifier or to a DC voltage produced from the power supply via a high-value resistor chain in a manner which is known, is used to provide the current necessary for starting the switched-mode power supply. Connected in parallel with the capacitor C1 is a zener diode D3, which limits the operating voltage VCC.

On the secondary side, the FIGURE shows a winding W3 which, via a diode D5 and a capacitor C3, produces an output voltage UA which is to be stabilized. This output voltage UA is tapped off across a resistor R7 by a secondary-side regulating stage SR and is conditioned for transmission to the primary side. Transmission is effected by a coupling element, which is an optocoupler OK in this illustrative embodiment. Other coupling elements, such as transformers, can likewise be used. On the primary side, the regulating signal transmitted by the regulating stage SR via the optocoupler OK is applied to the control circuit DR, which converts this signal into a pulse-width-modulated control voltage U2 for driving the switching transistor T1. The control circuit DR also uses another voltage U1 for driving, said voltage being applied across a resistor R3 and being an indication of the current flowing through the switching transistor T1.

The switched-mode power supply can be designed both as a free-running switched-mode power supply which changes its switching frequency depending on the load, and as a switched-mode power supply operating with pulse-width modulation at a fixed switching frequency. A switched-mode power supply of this type is specified in EP 0 808 015 A2, for example. In this case, the regulation is frequently applied to a secondary-side output voltage, since this allows better stabilization of the output voltage.

Between the operating voltage VCC and the control input of the switching transistor T1 there is a resistor R1 in order to allow the control voltage U2 to be decoupled from the control circuit DR and the operating voltage VCC. In this connection between the switching transistor T1 and the operating voltage VCC there is a first switch T2, in this illustrative embodiment a transistor, which can turn off the operating voltage VCC. The control input of this switch is connected via resistors R5 and R6 to the optocoupler OK, which can be used to drive the switch T2 from the secondary side. If the optocoupler OK has a high impedance on the primary side, then the operating voltage VCC is applied to the control input of the first switch T2 via a resistor R4, so that no current can flow via the emitter-base junction of the transistor T2, which means that the latter is off. If a low voltage is applied to the control input of the switch T2, then the latter turns on. The control circuit DR is likewise connected to the optocoupler OK via a diode D1 and the resistor R6, so that said optocoupler transmits both the secondary-side regulating information and the turn-off signal for the first switch T2.

On the secondary side, the optocoupler contains a light-emitting diode operated via connections 3 and 4. This diode is driven by a transistor stage having a transistor T3 controlling the current through the light-emitting diode in the optocoupler, a secondary-side operating voltage UB being applied to the connection 3 of the optocoupler via a second switch T4. The control input of the transistor T3 has a constant voltage applied to it which is formed by a voltage divider which contains a resistor R9 and a zener diode D6 and which has the operating voltage UB across it during operation. Via a voltage divider formed from the resistors R7 and R8, the emitter of the transistor T3 is at the output voltage UA to be regulated, so that the current through the light-emitting diode of the optocoupler OK is controlled via the base-emitter junction of the transistor T3 as a function of the output voltage UA. Instead of this transistor stage having the transistor T3, a variable zener diode can also be used for transmitting the regulating signal.

The second switch T4 is turned on and off via a transistor stage T5 having resistors R11, R12 by a control signal US from a digital circuit. If the control signal US is "zero", then transistor T5 is off, which means that the transistor T4 is also off, because its control input is in this case at a high potential via the resistor R10.

If the switch T4 is off, then neither the transistor stage having the transistor T3 nor the light-emitting diode in the optocoupler OK are live. This means that the photoresistance of the optocoupler OK is also high, so that the first switch T2 is likewise off, as described above. In this case, the control circuit DR also switches off, since no more current flows through the diode D1.

The regulating transmission via the optocoupler OK is carried out so that, when the output voltage UA is too high, the output of the optocoupler OK, connections 1 and 2, has a relatively high impedance, and, when the output voltage UA is too low, it has a relatively low impedance. The MOSFET used as a switching transistor is off at a control voltage U2 of below approximately 2 volts. The control circuit DR is likewise decoupled from the operating voltage VCC by the diode D1. If the control signal US is zero, therefore, then neither the secondary-side switching stages having the transistors T3, T4 and T5 nor the transistors T1 and T2 and the primary-side control circuit DR are live. When the switched-mode power supply is in the turned-off state, this means that only the starting circuit A consumes a very small amount of power.

The connection 2 of the optocoupler OK is connected to a flyback negative winding W2b via a diode D4, so that the switched-mode power supply starts softly when it is turned on. In the switched-mode power supply's starting phase, the negative voltage present on the winding W2b during the turned-off phase of the switching transistor T1 is still relatively low, so that the regulating signal transmitted via the optocoupler OK is attenuated. Only in normal operation, when the flyback negative voltage has developed on the winding W2b and the capacitor C2 is charged to a corresponding negative voltage, does the regulating signal become active at full strength for the control circuit DR.

A switched-mode power supply of this type can be used, in particular, in appliances for consumer electronics, and allows the power consumption to be kept very low in standby operation. In these appliances, flyback converters are predominantly used as the power supply unit, but the invention can also be used for other types of switched-mode power supplies. However, the second operating voltage UB must always be present in order to turn on the switched-mode power supply. This operating voltage can be provided by a second power supply unit, for example, or by a battery or a rechargeable battery.

What is claimed is:
1. Switched-mode power supply comprising:
   a transformer with a primary winding and with secondary windings, providing mains power isolation,
   a switching transistor in series with said primary winding,
   a primary-side control circuit for driving said switching transistor, and
   a secondary-side regulating stage for controlling an output voltage,
   a coupling element for transmitting a regulating signal of said regulating stage to said control circuit,
   a first switch being arranged between a control input of said switching transistor and a primary side supply voltage, and
   a second switch being arranged between said regulating stage and an operating voltage, to which control input a control signal is applied for turning-off said power supply via said first switch.
2. Switched-mode power supply according to claim 1, wherein the regulating stage comprises a transistor stage whose connections are connected to an output voltage of the switched-mode power supply, to the coupling element and to the second switch in order to transmit both said regulating signal and said switch-off signal.
3. Switched-mode power supply according to claim 1, wherein, on the primary side, one connection of said coupling element is connected to an auxiliary winding of the transformer, and another connection of the coupling element is connected both to said first switch and to said control circuit.
4. Switched-mode power supply according to claim 1, wherein said control circuit is coupled via a diode to said coupling element.
5. Switched-mode power supply according to claim 1, wherein the control input of said first switch is connected to the primary-side operating voltage via a resistor, for turning off said first switch in case of a high impedance of said coupling element.
6. Switched-mode power supply according to claim 1, wherein said coupling element is an optocoupler, an emitter connection of which on the primary side is connected to a flyback negative winding, for providing a softstart when the switched-mode power supply is turned on.
7. Switched-mode power supply according to claim 1, wherein the secondary-side operating voltage is provided by another power supply unit, and in that the switched-mode power supply is used as an additional power supply unit which can be fully disconnected and reconnected by means of said control signal.

8. Switched-mode power supply comprising:

a transformer with a primary winding and with secondary windings, providing mains power isolation, a switching transistor in series with said primary winding, a primary-side control circuit for driving said switching transistor, and a secondary-side regulating stage for controlling an output voltage, a coupling element for transmitting a regulating signal of said regulating stage to said control circuit, a first switch being arranged between a control input of said switching transistor and a primary side supply voltage, and a second switch being arranged between said regulating stage and an operating voltage, to which control input a control signal is applied for switching-off said operating voltage via said second switch and for switching off said supply voltage via said coupling element and said first switch.

9. Switched-mode power supply comprising a transformer with a primary winding, a primary side auxiliary winding, and with secondary windings, providing mains power isolation, a switching transistor in series with said primary winding, a primary-side control circuit for driving said switching transistor, and a secondary-side regulating stage for controlling an output voltage, a coupling element for transmitting a regulating signal of said regulating stage to said control circuit, said auxiliary winding providing a primary side supply voltage, a first switch being coupled to said primary side supply voltage, and a second switch being arranged between said regulating stage and an operating voltage, to which control input a control signal is applied for turning off said power supply via said first switch.

10. Switched-mode power supply according to claim 9, characterized in that between said first switch and said auxiliary winding a diode is coupled, and a capacitor to ground, for providing a smoothed supply voltage.

11. Switched-mode power supply according to claim 10, characterized in that to said capacitor a starting-up circuit is coupled.

12. Switched-mode power supply comprising:

a transformer with a primary winding and with secondary windings, providing mains power isolation, a switching transistor in series with said primary winding, a primary-side control circuit for driving said switching transistor, and a secondary-side regulating stage for controlling an output voltage, a coupling element for transmitting a regulating signal of said regulating stage to said control circuit, a first switch being arranged between a control input of said switching transistor and a primary side supply voltage, and a second switch being arranged between said regulating stage and an operating voltage, to which control input a control signal is applied for turning-off said power supply via said first switch.

13. Switched-mode power supply according to claim 12, wherein the regulating stage comprises a transistor stage whose connections are connected to an output voltage of the switched-mode power supply, to the coupling element and to the second switch in order to transmit both said regulating signal and said switch-off signal.

14. Switched-mode power supply according to claim 12, wherein, on the primary side, one connection of said coupling element is connected to an auxiliary winding of the transformer, and another connection of the coupling element is connected both to said first switch and to said control circuit.

15. Switched-mode power supply according to claim 12, wherein said control circuit is coupled via a diode to said coupling element.

16. Switched-mode power supply according to claim 12, wherein the control input of said first switch is connected to the primary-side operating voltage via a resistor, for turning off said first switch in case of a high impedance of said coupling element.

17. Switched-mode power supply according to claim 1, wherein said coupling element is an optocoupler, an emitter connection of which on the primary side is connected to a flyback negative winding, for providing a softstart when the switched-mode power supply is turned on.

18. Switched-mode power supply according to claim 12, wherein the secondary-side operating voltage is provided by another power supply unit, and in that the switched-mode power supply is used as an additional power supply unit which can be fully disconnected and reconnected by means of said control signal.

* * * * *